United States Patent
Duda et al.

(10) Patent No.: US 7,065,762 B1
(45) Date of Patent: Jun. 20, 2006

(54) METHOD, APPARATUS AND COMPUTER PROGRAM PRODUCT FOR BORROWED-VIRTUAL-TIME SCHEDULING

(75) Inventors: Kenneth J. Duda, Hillsborough, CA (US); David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/273,806

(22) Filed: Mar. 22, 1999

(51) Int. Cl.
*G06F 9/46* (2006.01)
(52) U.S. Cl. ............... 718/102; 718/107; 370/395.4
(58) Field of Classification Search ........ 718/100–104, 718/107; 370/412, 395.4; 709/232; 719/314
See application file for complete search history.

(56) References Cited

U.S. PATENT DOCUMENTS

| | | | |
|---|---|---|---|
| 4,131,767 A | 12/1978 | Weinstein | |
| 4,161,719 A | 7/1979 | Parikh et al. | |
| 4,316,284 A | 2/1982 | Howson | |
| 4,397,020 A | 8/1983 | Howson | |
| 4,419,728 A | 12/1983 | Larson | |
| 4,424,565 A | 1/1984 | Larson | |
| 4,437,087 A | 3/1984 | Petr | |
| 4,438,511 A | 3/1984 | Baran | |
| 4,439,763 A | 3/1984 | Limb | |
| 4,445,213 A | 4/1984 | Baugh et al. | |
| 4,446,555 A | 5/1984 | Devault et al. | |
| 4,456,957 A | 6/1984 | Schieltz | |
| 4,464,658 A | 8/1984 | Thelen | |
| 4,499,576 A | 2/1985 | Fraser | |
| 4,506,358 A | 3/1985 | Montgomery | |
| 4,507,760 A | 3/1985 | Fraser | |
| 4,532,626 A | 7/1985 | Flores et al. | |
| 4,644,532 A | 2/1987 | George et al. | |
| 4,646,287 A | 2/1987 | Larson et al. | |
| 4,677,423 A | 6/1987 | Benvenuto et al. | |

(Continued)

FOREIGN PATENT DOCUMENTS

EP    0 384 758 A2    8/1990

(Continued)

OTHER PUBLICATIONS

Marsan et al. "RPA: a flexible scheduling algorithm for input buffered switches" pp. 1-4, 1988 IEEE.*

(Continued)

*Primary Examiner*—William Thomson
*Assistant Examiner*—Van Nguyen
(74) *Attorney, Agent, or Firm*—Campbell Stephenson Ascolese LLP

(57) ABSTRACT

The present invention includes a scheduling mechanism that fairly allocates a resource to a number of schedulable elements of which some are latency-sensitive. The invention tracks each element's use of the resource by determining the element's virtual time. An active element is selected from the elements that are ready to use the resource by determining the element that has the smallest effective virtual time. The effective virtual time is the element's actual virtual time modified by a borrowed virtual time value. When an element has a short-term need for the resource, it can borrow the privilege to run by borrowing virtual time. As the element uses the resource, it consumes virtual time according to its weight. When the elements are scheduled for the resource, the ready elements having the smallest virtual time is selected. The invention enforces long-term fairness to each element while allowing latency-sensitive elements to be preferably selected.

57 Claims, 10 Drawing Sheets

U.S. PATENT DOCUMENTS

| | | |
|---|---|---|
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,767 A | 10/1990 | Kinoshita et al. |
| 4,965,772 A | 10/1990 | Daniel et al. |
| 4,970,678 A | 11/1990 | Sladowski et al. |
| 4,979,118 A | 12/1990 | Kheradpir .................. 364/436 |
| 4,980,897 A | 12/1990 | Decker et al. |
| 4,991,169 A | 2/1991 | Davis et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,034,919 A | 7/1991 | Sasai et al. |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,128,945 A | 7/1992 | Enns et al. |
| 5,136,580 A | 8/1992 | Videlock et al. |
| 5,166,930 A | 11/1992 | Braff et al. |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. .......... 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema |
| 5,442,457 A | 8/1995 | Najafi |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,485,455 A | 1/1996 | Dobbins et al. |
| 5,490,140 A | 2/1996 | Abensour et al. |
| 5,490,258 A | 2/1996 | Fenner |
| 5,491,687 A | 2/1996 | Christensen et al. |
| 5,491,804 A | 2/1996 | Heath et al. |
| 5,497,368 A | 3/1996 | Reijnierse et al. |
| 5,504,747 A | 4/1996 | Sweasey |
| 5,509,006 A | 4/1996 | Wilford et al. |
| 5,517,494 A | 5/1996 | Green |
| 5,519,704 A | 5/1996 | Farinacci et al. |
| 5,519,858 A | 5/1996 | Walton et al. .............. 395/600 |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. |
| 5,541,911 A | 7/1996 | Nilakantan et al. |
| 5,546,370 A | 8/1996 | Ishikawa |
| 5,555,244 A | 9/1996 | Gupta et al. |
| 5,561,669 A | 10/1996 | Lenney et al. |
| 5,583,862 A | 12/1996 | Callon |
| 5,592,470 A | 1/1997 | Rudrapatna et al. |
| 5,598,581 A | 1/1997 | Daines et al. |
| 5,600,798 A | 2/1997 | Cherukuri et al. |
| 5,602,770 A | 2/1997 | Ohira |
| 5,604,868 A | 2/1997 | Komine et al. |
| 5,608,726 A | 3/1997 | Virgile |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe |

| | | | |
|---|---|---|---|
| 5,632,021 A | 5/1997 | Jennings et al. | |
| 5,634,010 A | 5/1997 | Ciscon et al. | |
| 5,638,359 A | 6/1997 | Peltola et al. | |
| 5,644,718 A | 7/1997 | Belove et al. | |
| 5,659,684 A | 8/1997 | Giovannoni et al. | |
| 5,666,353 A | 9/1997 | Klausmeier et al. | |
| 5,673,265 A | 9/1997 | Gupta et al. | |
| 5,678,006 A | 10/1997 | Valizadeh et al. | |
| 5,680,116 A | 10/1997 | Hashimoto et al. | |
| 5,684,797 A | 11/1997 | Aznar et al. | |
| 5,687,324 A | 11/1997 | Green et al. | |
| 5,689,506 A | 11/1997 | Chiussi et al. | |
| 5,694,390 A | 12/1997 | Yamato et al. | |
| 5,724,351 A | 3/1998 | Chao et al. | |
| 5,740,097 A | 4/1998 | Satoh | |
| 5,748,186 A | 5/1998 | Raman | |
| 5,748,614 A * | 5/1998 | Wallmeier | 370/395.41 |
| 5,748,617 A | 5/1998 | McLain, Jr. | |
| 5,754,547 A | 5/1998 | Nakazawa | |
| 5,801,938 A * | 9/1998 | Kalantery | 700/2 |
| 5,802,054 A | 9/1998 | Bellenger | |
| 5,812,844 A * | 9/1998 | Jones et al. | 718/104 |
| 5,835,710 A | 11/1998 | Nagami et al. | |
| 5,841,874 A | 11/1998 | Kempke et al. | |
| 5,854,903 A | 12/1998 | Morrison et al. | |
| 5,856,981 A | 1/1999 | Voelker | |
| 5,892,924 A | 4/1999 | Lyon et al. | 395/200.75 |
| 5,898,686 A | 4/1999 | Virgile | |
| 5,903,559 A | 5/1999 | Acharya et al. | |
| 5,944,778 A * | 8/1999 | Takeuchi et al. | 718/100 |
| 5,991,812 A * | 11/1999 | Srinivasan | 709/232 |
| 6,122,673 A * | 9/2000 | Basak et al. | 709/238 |
| 6,385,638 B1 * | 5/2002 | Baker-Harvey | 718/107 |
| 6,438,134 B1 * | 8/2002 | Chow et al. | 370/412 |
| 6,668,269 B1 * | 12/2003 | Kamada et al. | 718/103 |

FOREIGN PATENT DOCUMENTS

| | | |
|---|---|---|
| EP | 0 431 751 A1 | 6/1991 |
| EP | 0 567 217 A2 | 10/1993 |
| WO | WO93/07569 | 4/1993 |
| WO | WO93/07692 | 4/1993 |
| WO | WO94/01828 | 1/1994 |
| WO | WO95/20850 | 8/1995 |

OTHER PUBLICATIONS

Hui "Predictive queueing multiple access-a wireless ATM protocol for multimedia communication" pp. 107-111, 1997 IEEE.*

Allen, M., "Novell IPX Over Various WAN Media (IPXWAN)," Network Working Group, RFC 1551, Dec. 1993, pp. 1-22.

Becker, D., "3c589.c: A 3c589 EtherLink3 ethernet driver for linux," becker@CESDIS.gsfc.nasa.gov, May 3, 1994, pp. 1-13.

Chowdhury, et al., "Alternative Bandwidth Allocation Algorithms for Packet Video in ATM Networks," INFOCOM 1992, PP. 1061-1068.

Doeringer, W., "Routing on Longest-Matching Prefixes," IEEE/ACM Transactions in Networking, vol. 4, No. 1, Feb. 1996, pp. 86-97.

Esaki, et al., "Datagram Delivery in an ATM-Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409-411.

Pei, et al., "Putting Routing Tables in Silicon," IEEE Network Magazine, Jan. 1992, pp. 42-50.

Perkins, D., "Requirements for an Internet Standard Point-to-Point Protocol," Network Working Group, RFC 1547, Dec. 1993, pp. 1-19.

Simpson, W., "The Point-to-Point Protocol (PPP)," Network Working Group, RFC 1548, Dec. 1993, pp. 1-53.

Tsuchiya, P.F., "A Search Algorithm for Table Entries with Non-Contiguous Wildcarding," Abstract, Bellcore.

Zhang, et al., "Rate-Controlled Static-Priority Queueing," INFOCOM 1993, pp. 227-236.

William Stallings, Data and Computer Communications, PP: 329-333, Prentice Hall, Upper Saddle River, New Jersey 07458.

* cited by examiner

METHOD, APPARATUS AND COMPUTER PROGRAM PRODUCT FOR BORROWED-VIRTUAL-TIME SCHEDULING

BACKGROUND OF THE INVENTION

1. Field of the Invention

This invention relates to the field of scheduling electronic and computer resources.

2. Background

There are many circumstances where a resource is shared between elements. For example, the resources of a computer system are shared by the programs executing in the computer system. In a computer system, one particular example of a shared resource is the time available to the processor that executes programs stored in the computer's memory. This resource (the processor time) is allocated to elements in the computer system (threads-of-execution) that use the processor time.

Another example of a shared resource occurs in an output-queued data switch. Such a switch dispatches data received from an input port to a queue associated with the destination output port. The queue then feeds the output port. There can be a number of queues for each output port. The shared resource is the amount of time each queue (an element) has access to the output port. In other words, the shared resource is the output port's bandwidth.

In both of these cases (and many others), the available time of the resource is shared between multiple elements under control of a scheduling mechanism that implements a scheduling algorithm. The scheduling mechanism can include programmed processes that are executed by a processor to effect a scheduling algorithm, circuitry that effectuates a scheduling algorithm, or other known mechanisms. In addition, the scheduling mechanism may be preemptive or non-preemptive. In the case of a computer system, a preemptively scheduling operating system allocates a quantum of processor time to an element and potentially schedules another element (for example, when the quantum of time expires, if the element relinquishes the processor, or for other reasons). In the case of a non-preemptively scheduling operating system, each element must explicitly give other elements the opportunity to access the processor.

There are many known scheduling algorithms. Some of these algorithms are designed to fairly allocate the resource between the elements. Fairness can be defined as each element asymptotically (over time) receiving its weighted share of the resource's time. Other definitions of fairness are known in the art.

The greater the element's weight, the greater its fair share of the resource. Letting R(t) denote the set of all competing elements at time t, the instantaneous fair share of an element i at time t is defined as:

$$f_i(t) = \frac{w_i}{\sum_{j \in R(t)} w_j}$$

Known scheduling algorithms include weighted fair queuing scheduling, round robin scheduling, priority based scheduling, deadline scheduling, and other scheduling algorithms. One problem with the known art is that often an element is sensitive to latency. One example of a latency-sensitive element in a computer system is a program that displays video images. Each frame needs to be promptly displayed after the expiration of a timer. If the frame is delayed, the displayed video will appear jerky. Another example of a latency-sensitive element is a high service requirement data packet queue (containing, for example, voice or video data) flowing through a data switch. The data switch performance will be inadequate if the data packet is not transferred to the output port of the data switch within its service requirement. In both of these examples, the purpose of the element is degraded if the required resource is not available when needed.

Deadline scheduling techniques allow an element to declare its future resource needs and to request that the scheduler accommodate the declared need. The scheduler may accept or decline this request (if declined, the scheduler treats the requesting element in its default manner). One problem with this approach is that it is difficult for an element to determine how much of the resource the element requires. Other problems are: that if multiple elements declare more resource capability than is available, other elements may be starved for the resource; that the system is unpredictable if some of the declaring elements that request resource are accepted and other elements denied; that the elements often incorrectly estimate their resource need; and that the deadline scheduling is complex to implement.

Although, latency-sensitive elements can be scheduled using a priority-based algorithm such scheduling is often unfair and can lead to resource starvation of lower priority elements.

It would be advantageous to schedule a resource between elements to maintain a fair long-term allocation of the resource to the elements while still satisfying the responsive needs of latency-sensitive elements. Such scheduling would improve the performance of a device that maintains a fair long-term allocation of a resource to multiple elements while still handling latency-sensitive elements. As applied to a computer system, such a thread-of-execution scheduling system would improve the performance of the computer system. As applied to a data switch, such an output port scheduling algorithm would improve the performance of the latency-sensitive data streams through the switch.

SUMMARY OF THE INVENTION

The present invention includes a scheduling mechanism that fairly allocates a resource to a number of schedulable elements of which some are latency-sensitive. The invention tracks each element's use of the resource by determining the element's virtual time. An active element is selected from the elements that are ready to use the resource by determining the element that has the smallest effective virtual time. The effective virtual time is the element's actual virtual time modified by a borrowed virtual time value. When an element has a short-term need for the resource, it can borrow the privilege to run by borrowing virtual time. As the element uses the resource, it consumes virtual time according to its weight. When the elements are scheduled for the resource, the ready element having the smallest virtual time is selected. The invention enforces long-term fairness to each element while allowing latency-sensitive elements to be preferably selected. One preferred embodiment is a thread-of-execution scheduler for a computer system. This embodiment allocates the CPU time (the resource) between multiple threads (the elements). Latency-sensitive threads (for example, video display programs) can borrow virtual time so that they are more likely to be scheduled when a condition is satisfied (for example, expiration of a timer that triggers the display of the next video frame). Another preferred embodiment is a queue scheduler for an output-queued data switch. Here multiple queues feed an output port. The multiple queues have different service requirements. The invention provides long-term fairness while still satisfying queues that contain latency-sensitive data.

DESCRIPTION OF THE PREFERRED EMBODIMENTS

Notations and Nomenclature

The following 'notations and nomenclature' are provided to assist in the understanding of the present invention and the preferred embodiments thereof.

Thread, Thread-of-execution—A thread-of-execution is a sequence of control within a programmed-process. A traditional single-threaded programmed-process follows a single sequence of control while executing. A multithreaded programmed-process has several sequences of control, and is capable of several independent actions.

Pointer—A pointer is a data value that is used to reference a data structure or an object. One skilled in the art will understand that "pointer" includes, without limitation, a memory address to, or a value used to calculate the address to the information of interest and any functional equivalents including handles and similar constructs.

Procedure—A procedure can be a self-consistent sequence of computerized steps that lead to a desired result. These steps are defined by one or more computer instructions. These steps are performed by a computer executing the instructions that define the steps. Thus, the term "procedure" can refer to a sequence of instructions, a sequence of instructions organized within a programmed-procedure or programmed-function, or a sequence of instructions organized within programmed-processes executing in one or more computers. A procedure also includes operations performed by specially designed hardware logic that lead to a desired result.

Process—A process is a sequence of method steps as compared to the computer science term that associates memory with a thread of execution (that is, the term "process" as used herein does not refer to programmed-processes serviced by a computer's operating system).

DETAILED DESCRIPTION

The invention can be incorporated within at least two preferred embodiments. One preferred embodiment is that of a scheduler for threads-of-execution within a computer system. Another preferred embodiment is that of a scheduler for different output queues for an output queued data switch. The invention schedules elements (threads, queues) to use a resource (CPU time, output port bandwidth) such that each element receives its fair share of the resource over time while still being responsive to short-term latency-sensitive needs.

Figure 1:
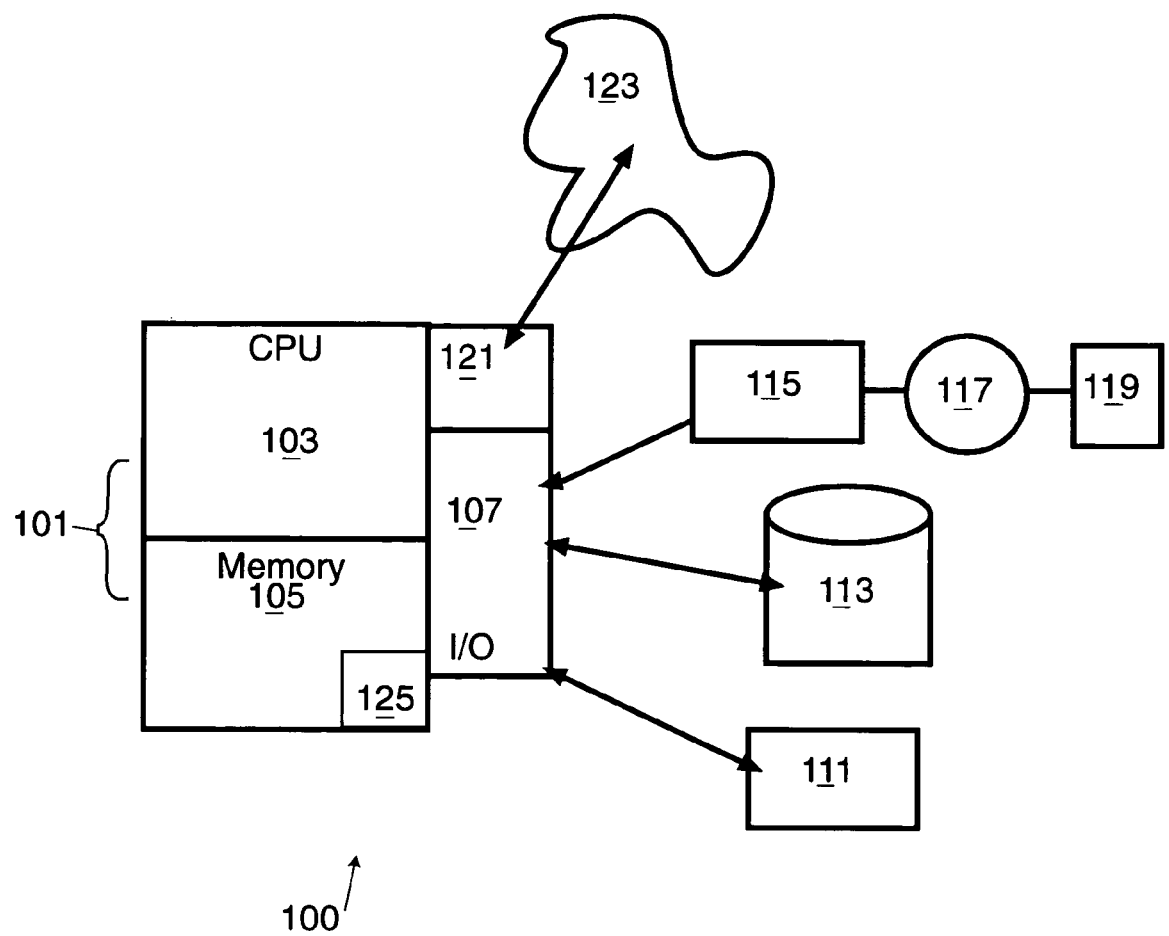
FIG. 1 illustrates a computer system capable of using the invention in accordance with a preferred embodiment.

FIG. 1 illustrates a computer, indicated by general reference character 100, that incorporates the invention. The computer 100 includes a processor 101 that incorporates a central processor unit (CPU) 103, a memory section 105 and an input/output (I/O) section 107. The I/O section 107 is connected to a user interaction mechanism 111, a disk storage unit 113 and a CD-ROM drive unit 115. The CD-ROM drive unit 115 can read a CD-ROM medium 117 that typically contains a program and data 119. The CD-ROM drive unit 115 (along with the CD-ROM medium 117) and the disk storage unit 113 comprise a filestorage mechanism. Some embodiments of the invention include a network interface 121 that connects the computer 100 to a network 123. A program 125 incorporating the invention can be stored in the memory section 105. The instructions contained in the program 125 are executed by the CPU 103. One skilled in the art will understand that not all of the displayed features of the computer 100 need to be present for the invention. In addition, any removable media can be used in place of the CD-ROM medium 117 so long as a suitable device is available to read the media. The program 125 can be loaded into memory from the file system or from the network 123.

The time spent by the CPU 103 executing code is a resource. One scheduling issue is how to share the available CPU time between threads-of-execution. Generally, the operating system in the computer contains a scheduler that allocates CPU time to threads-of-execution. Each thread is available to use the CPU (that is, the thread is ready) unless the thread is blocked (not ready to be activated). The active element is the one that is to use the resource. Thus, the active thread is the thread that is to use the CPU.

One problem with scheduling threads in a computer system is that it is difficult to fairly accommodate both latency-sensitive threads and latency-insensitive threads. In one preferred embodiment the borrowed-virtual-time (BVT) scheduler of the invention provides a thread scheduler that is both fair and accommodates latency-sensitive threads.

In another preferred embodiment, the BVT scheduler can be used with a data switch to allocate the bandwidth of an output port (by allocating the time that the output port is available to a queue). The BVT scheduler provides fair use of the output port bandwidth while providing lower latency service for latency-sensitive traffic for data having different latency-sensitivity characteristics.

Figure 2A:
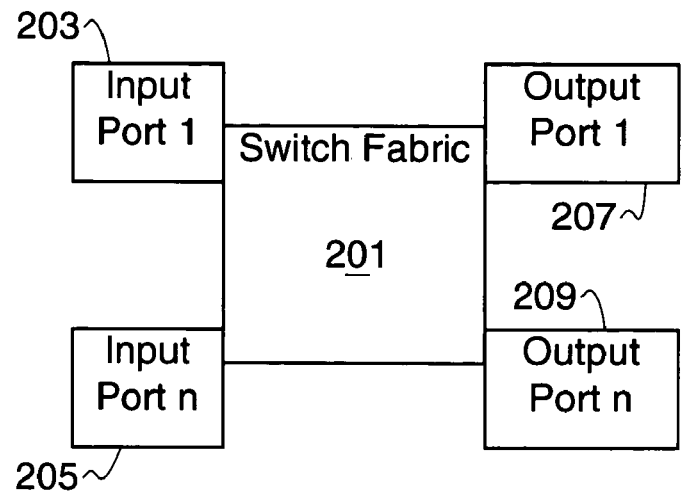
FIG. 2A illustrates a data switch in accordance with a preferred embodiment.

FIG. 2A illustrates a data switch, indicated by general reference character 200, showing some of the components that are included in a data switch. The data switch 200 includes a switch fabric 201, a first input port 203, an nth input port 205, a first output port 207, and an nth output port 209. The switch fabric 201 provides connections between any of the input ports and any of the output ports. A data packet or cell (not shown) enters the data switch 200 at one of input ports 207, 209. The data switch 200 examines the contents of the data packet (or cell) and determines the service requirements and destination output port or ports required by the data packet. The data packet (or pointer to the data packet) is then queued into one of the queues that feed the specified output port. The queue selection can be based on the data packet's service requirements (for example, but without limitation, latency-sensitive data packets can be placed in a different queue than latency-insensitive data packets, or multicast packets).

Hereinafter the term "data packet" refers to both a data cell (a fixed length unit of data) and a data packet (a variable length unit of data).

Figure 2B:
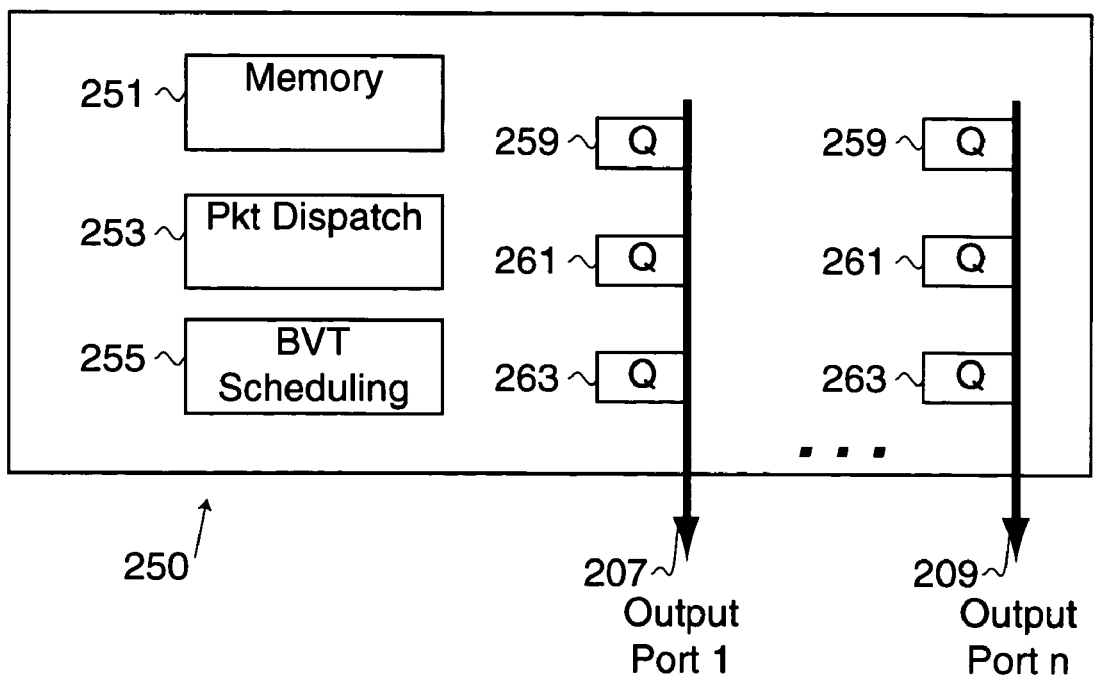
FIG. 2B illustrates a switch fabric for the data switch shown in FIG. 2A.

FIG. 2B details an output queued switch fabric, indicated by general reference character 250, that supports an output-queued capability. Once the data packet enters the data switch 200, the data packet is stored in a memory 251. The switch fabric 250 also includes a packet dispatch mechanism 253 and a BVT scheduling mechanism 255. The packet dispatch mechanism 253 examines the contents of the data packet, and determines the level of service and the output port(s) required by the data packet. Depending on the level of service required (for example, latency-sensitive or latency insensitive) and/or type of service required (for example, multicast or unicast), a pointer to the data packet is stored (for example, but without limitation) in either a 'bulk service' queue 259, an 'interactive latency service' queue 261, or a 'real-time latency service' queue 263 for the specified output port. The BVT scheduling mechanism 255 then fairly allocates the bandwidth of the output port to each of these queues while satisfying latency-sensitive packet requirements as is subsequently described. The number of queues feeding the output port need not be three. BVT scheduling can be accomplished as long as there are two or more queues and an algorithm for determining which queue to use for any given data packet.

One skilled in the art will understand that the bandwidth is a function of the speed of the output port and the time required to send information through the port. Thus, allocation of the time the output port is available to a queue is equivalent to allocating bandwidth to the queue.

Although much of the subsequent description of the invention is directed toward the scheduling of a computer's CPU, one skilled in the art will understand how to use BVT scheduling in an output-queued data switch such as the one shown in FIG. 2A and FIG. 2B.

Figure 3:
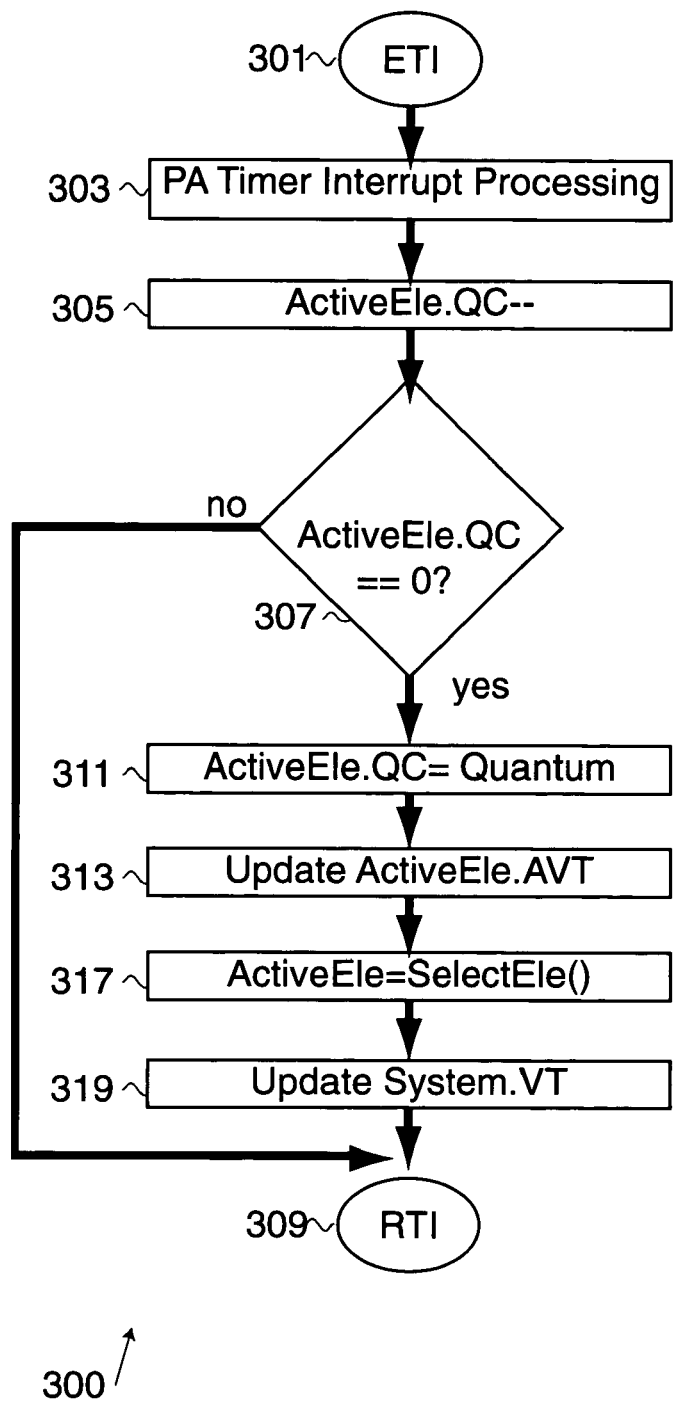
FIG. 3 illustrates a scheduling process in accordance with a preferred embodiment.

FIG. 3 illustrates a preemptive scheduling process, indicated by general reference character 300, used to schedule a resource among a plurality of elements. In the case of a preemptive scheduling algorithm performed by a computer that is executing procedures, the preemptive scheduling process 300 is often initiated as a result of a system timer interrupt, when a thread yields, or when a thread blocks or unblocks. One skilled in the art will understand that other mechanisms can be used within the computer context and that yet other mechanisms can be used within a data switch to effectuate the preemptive scheduling process 300. When interrupt driven, the preemptive scheduling process 300 initiates when a timer interrupt occurs at an 'enter timing interrupt' terminal 301 and continues to a 'prior art timer interrupt' procedure 303. The 'prior art timer interrupt' procedure 303 performs relevant prior art processing for the timer interrupt. Then the preemptive scheduling process 300 continues to a 'decrement quantum counter' procedure 305 that decrements the quantum counter for the active element.

Next, a 'quantum complete' decision procedure 307 determines whether the quantum allocated to the element has completed. If the quantum has not expired, the preemptive scheduling process 300 exits through a 'return from interrupt' terminal 309. The quantum is set to run for some multiple of clock ticks and is the period-of-use of the resource by the element. That is, an element is allowed to have exclusive access to the resource for some number of clock ticks (the quantum or scheduled period-of-use).

Thus, for a thread scheduling BVT embodiment, the 'quantum complete' decision procedure 307 detects the expiration of a period-of-use for the resource (the CPU) that is allocated to the current element (a thread). Thus, the preemptive scheduling process 300 detects the expiration a period-of-use of the resource for the currently scheduled element. For a data switch, the period-of-use is the time required to send a packet or cell of data through the output port.

Once the element's quantum expires (because sufficient clock ticks have occurred to satisfy the 'quantum complete' decision procedure 307), the preemptive scheduling process 300 continues to a 'reset quantum counter' procedure 311. The 'reset quantum counter' procedure 311 resets the element's quantum counter for the element's next scheduled period-of-use.

A data switch does not require the determination of a quantum. The amount of data that is sent through the output port can be used to instantaneously determine the use of the output port's bandwidth as is subsequently described with respect to FIG. 6B.

An 'update virtual time' procedure 313 then updates the element's virtual time by adding a resource cost to the virtual time maintained for the element as subsequently described with respect to FIG. 4. The resource cost depends on the assigned weight of the element and the amount of time the element had access to the resource. The virtual time for the element also can be updated when the element becomes ready to use the resource as is subsequently described with respect to FIG. 7. Once the virtual time for each ready element has been determined, a 'select active element' procedure 317 selects and activates the active element from the collection of ready elements. The 'select active element' procedure 317 is subsequently described with respect to FIG. 5. It includes procedures for selecting the ready element that has the smallest effective virtual time. In addition, the preemptive scheduling process 300 updates the system's virtual time (a system reference-use for the resource) at an 'update system virtual time' procedure 319 (subsequently described with respect to FIG. 6A and FIG. 6B). Finally, the preemptive scheduling process 300 completes through the 'return from interrupt' terminal 309 allowing the activated thread to use the resource (CPU).

For a data switch the resource cost can be the size of the packet divided by the weight of the queue feeding the output port.

Other mechanisms known in the art can be used to determine the completion of a quantum other than by decrementing a counter.

The quantum counter for the thread scheduler, and a data packet completion detector in a data switch both serve to detect the expiration of a period-of-use of the resource (CPU time, and output port bandwidth) allocated to the element (thread or output port queue) utilizing the resource.

The 'update virtual time' procedure 313 updates a measure-of-use of the resource for the currently used element. The measure-of-use is a function of the period-of-use and a measure-of-use adjustment (such as a thread's quantum of execution and the weight of the thread).

The 'select active element' procedure 317 selects one of the elements to use the resource for a subsequent quantum of time or for the time required to transfer a subsequent data packet through the output port. This selection is responsive to the measure-of-use for each ready element. In a preferred embodiment, the element that has the smallest effective virtual time (EVT) is activated. Each element's EVT is responsive to the element's actual virtual time (AVT) minus an element-specific selection adjustment (the virtual time borrowed by the element). This is described in more detail with respect to FIG. 5.

One skilled in the art will understand how to apply the techniques described herein to non-preemptive scheduler mechanisms such that the period of use need not be scheduled, but can result from the programmed-processes relinquishing the CPU.

As was previously mentioned, the preemptive scheduling process 300 shown in FIG. 3 is directed toward a preferred embodiment of applying BVT scheduling to scheduling the access of multiple threads to CPU time.

In another preferred embodiment, for scheduling the access of multiple queues to an output port in a data switch, the processes related to determining the quantum of time used by the element is not needed as the data switch can directly determine the amount of bandwidth consumed by the transfer of the data packet. In addition, the data switch need not use interrupts because the functionality required to determine the resource utilization can be directly accomplished by circuitry. In this embodiment, the measure-of-use adjustment is dependent on the service requirement for the queue (for example and without limitation, interactive, batch, real-time).

Figure 4:
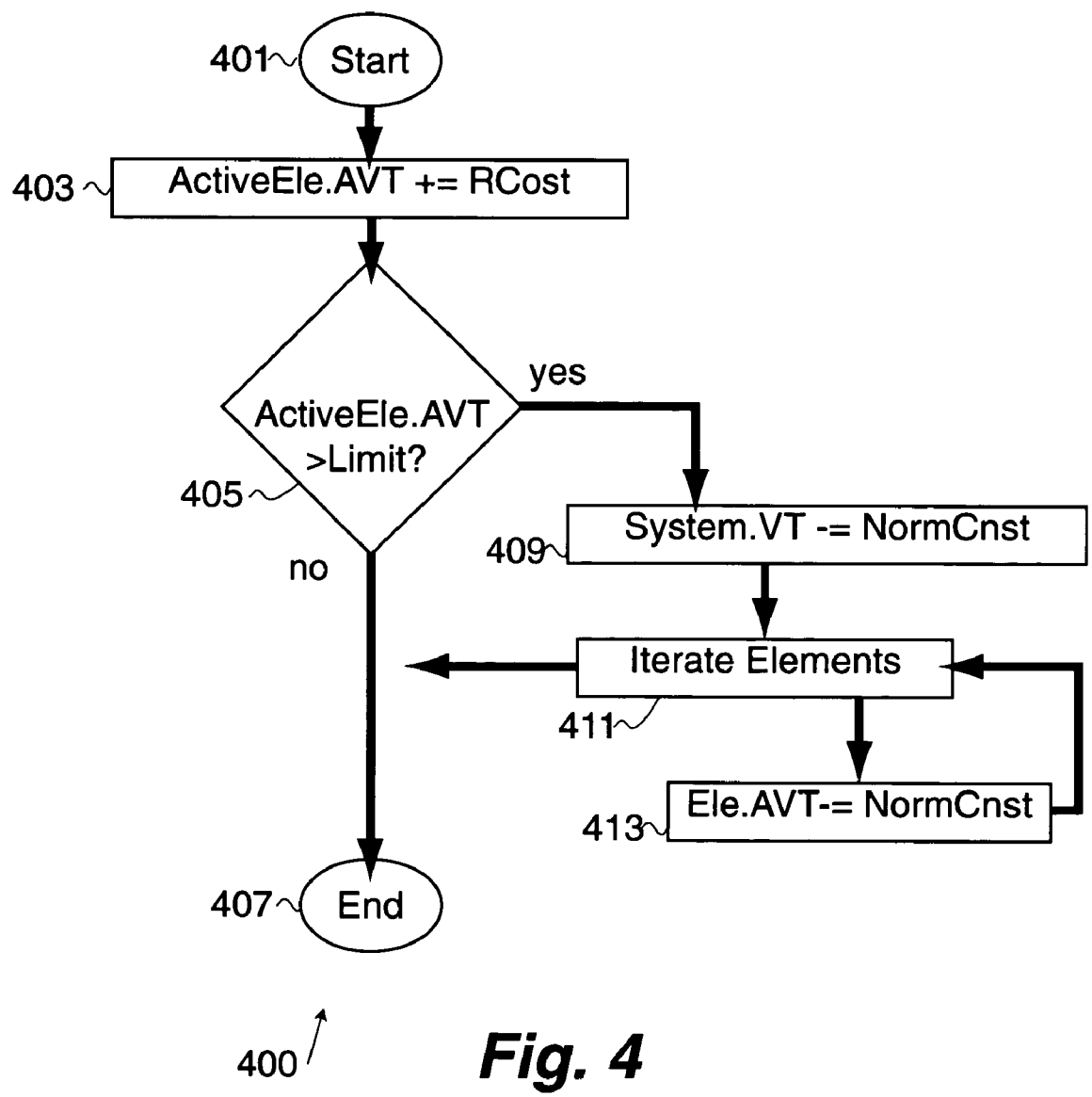
FIG. 4 illustrates a process to update the virtual time of an element in accordance with a preferred embodiment.

FIG. 4 illustrates an update virtual time process, indicated by general reference character 400, that is invoked by the 'update virtual time' procedure 313 and that initiates at a 'start' terminal 401. The update virtual time process 400 updates the element's virtual time by adding a resource cost to the element by an 'add resource cost' procedure 403. When the resource is the CPU time used to execute a thread, the resource cost is the CPU cost. The CPU cost can be determined by dividing the quantum by the weight assigned to the thread. The weight assigned to the thread indicates the thread's long-term proportional share of the CPU. Thus, in a preferred embodiment the AVT of the element's use of the resource (the measure-of-use for the resource) is increased as:

$$A_i \leftarrow A_i + \frac{q}{w_i}$$

where the AVT for element i is given by $A_i$ and the CPU cost is the quantum divided by the weight for the current element. Thus, when the element does not utilize the resource, the AVT for the element remains constant.

In the case of a data switch, the resource cost can be the weighted amount of the bandwidth that was used by the transfer of a data packet or data cell though the output port. This can be determined by the size of the packet divided by the weight assigned to the packet's queue.

The update virtual time process 400 continues to a 'maximum virtual time' decision procedure 405 to determine whether the AVT value has reached a limit. The purpose of the update virtual time process 400 is to normalize the virtual time values of all the elements and of the system when the virtual time value for a particular element overflows. Thus, this process has no direct affect on the scheduling decision (but does solve the infrequent problem of virtual time value overflow when practicing the invention). If the AVT value has not reached a limit, the update virtual time process 400 completes through an 'end' terminal 407. However, if the AVT value has exceeded the limit, the update virtual time process 400 continues to an 'adjust system virtual time' procedure 409 that adjusts the system's virtual time (SVT) by subtracting a normalization constant from the SVT. The SVT is further described with respect to FIG. 6A and FIG. 6B. The update virtual time process 400 then iterates each element at an 'iterate elements' procedure 411. When all of the elements have been iterated, the update virtual time process 400 completes through the 'end' terminal 407. The AVT for each iterated element is also reduced by the normalization constant (while staying positive) by an 'adjust virtual time of element' procedure 413. Thus, when an element's AVT passes a limit, the system's virtual time and every element's AVT is reduced by a normalization constant.

Figure 5:
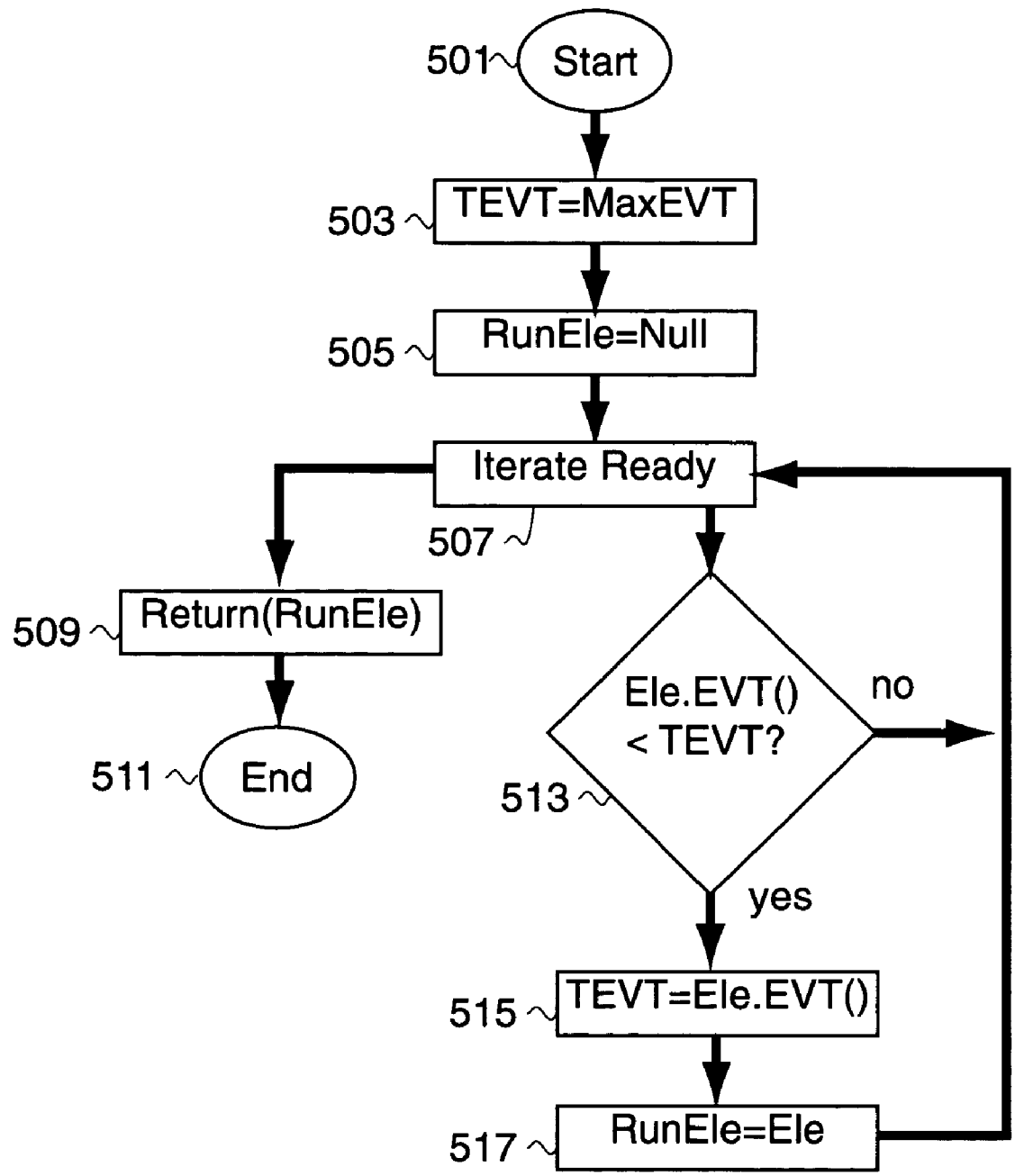
FIG. 5 illustrates a process to select an element in accordance with a preferred embodiment using a computer system.

FIG. 5 illustrates a 'select element' process, indicated by general reference character 500, that is invoked by the 'select active element' procedure 317 of FIG. 3. The 'select element' process 500 initiates at a 'start' terminal 501 and continues to a 'set max effective virtual time' procedure 503 that initializes the TEVT variable to the maximum possible effective virtual time (EVT). Next, an 'initialize pointer variable' procedure 505 sets pointer variable RunEle to Null. An 'iterate ready elements' procedure 507 then iterates over each ready element (one that is ready to consume the resource) to locate the element that has the smallest EVT. When the ready elements have been iterated, a 'return active element pointer' procedure 509 returns the pointer and the 'select element' process 500 completes through an 'end' terminal 511. As each ready element is iterated, a 'smallest effective virtual time' decision procedure 513 determines whether the iterated element's EVT is smaller than the value contained in TEVT. If not, the 'select element' process 500 continues to the 'iterate ready elements' procedure 507 to iterate the next ready element. Otherwise, the 'select element' process 500 continues to a 'set new minimum effective virtual time' procedure 515 that stores the iterated element's EVT in TEVT. Next, a 'set selected element pointer' procedure 517 stores the pointer to the element in RunEle and the 'select element' process 500 continues to the 'iterate ready elements' procedure 507. Thus, the element with the smallest effective virtual time (EVT) is the one selected to next receive access to the resource.

The EVT (E) for element i is defined to be:

$$E_i = A_i - b_i$$

where $b_i$ is the amount of virtual time-borrowed by the $i^{th}$ element (the borrowed virtual time), and $A_i$ is the actual virtual time as has been previously discussed.

Although described in terms of steps performed by a computer, one skilled in the art will understand that the above algorithm can be implemented by circuitry. Thus, in an output queued data switch, the steps used to decide which queue is to be selected to use the output port is implemented using circuitry.

Figure 6A:
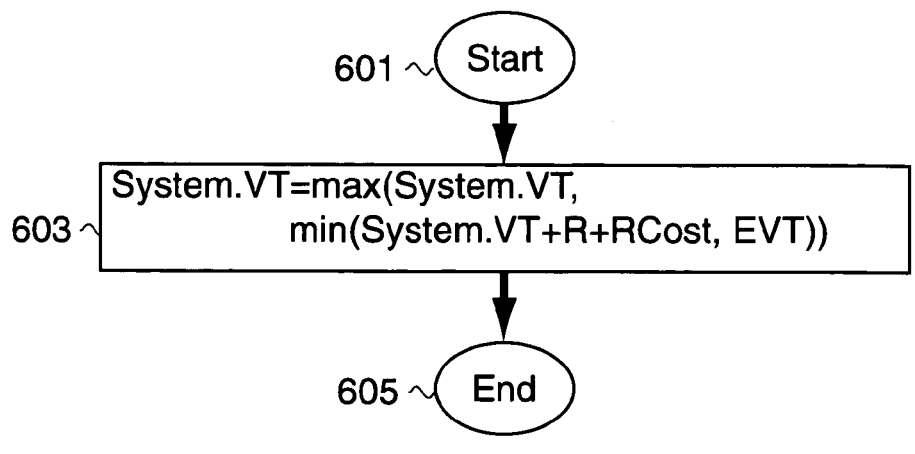
FIG. 6A illustrates a process to update the system reference-use in accordance with a preferred embodiment.

FIG. 6A illustrates an 'update system virtual time' process, indicated by general reference character 600, that is invoked by the 'update system virtual time' procedure 319 of FIG. 3 and that initiates at a 'start' terminal 601. The 'update system virtual time' process 600 continues to an 'update system virtual time' procedure 603 and completes through an 'end' terminal 605. The 'update system virtual time' procedure 603 updates the system's VT as:

System.VT=max(System.VT,
min(System.VT+R+RCost, EVT));

where RCost is the resource cost of the element that consumed the resource; R is the system virtual time convergence rate; and EVT is the effective virtual time of the newly selected element. Thus, if there is no active element the system's VT increases by R. The system virtual time represents the general area of virtual time where most of the element's virtual time lies. The system virtual time convergence rate (R) can be viewed as the rate an indebted element's debt is forgiven when no other elements want the resource. For a computer operating system, the system virtual time is the system reference-use for the processor executing the thread.

Figure 6B:
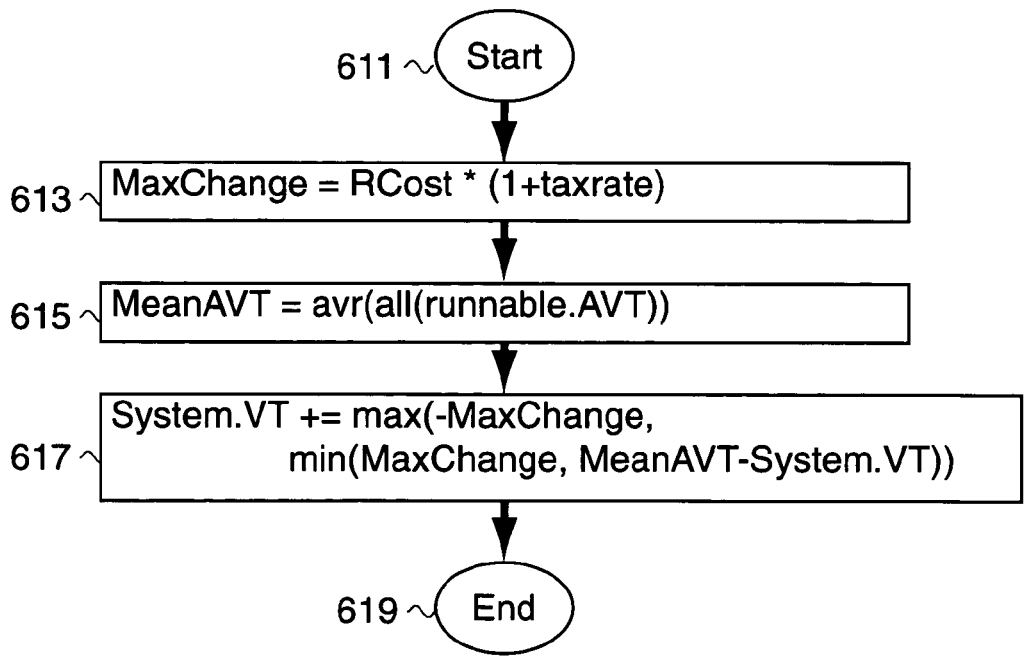
FIG. 6B illustrates a process to update the system reference-use in accordance with another preferred embodiment.
Figure 8A:
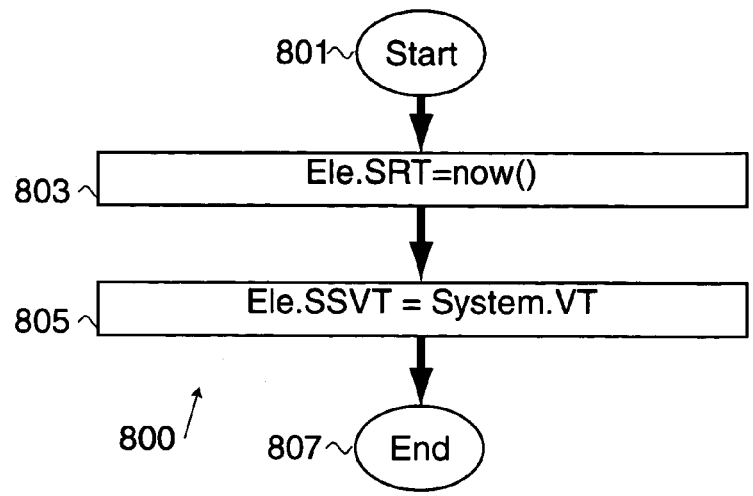
FIG. 8A illustrates a record virtual time process performed when an element goes inactive in accordance with a preferred embodiment.

FIG. 6B illustrates an 'update system virtual time' process, indicated by general reference character 610. This process can also be used to update the system's virtual time if the process described with respect to FIG. 8A is used to save information related to the time an element was blocked. The 'update system virtual time' process 610 initiates at a 'start' terminal 611 and is invoked by the 'update system virtual time' procedure 319 of FIG. 3. The 'update system virtual time' process 610 continues to a 'determine maxchange' procedure 613 that determines a MaxChange value that is the resource cost of the active element inflated by a taxrate value. A 'determine meanAVT' procedure 615 averages the AVT values over all of the elements that are ready to run to determine the mean of the actual virtual time (a virtual time average) for all elements currently capable of using the resource. An 'update system virtual time' procedure 617 updates the system's virtual time. The 'update system virtual time' process 610 completes through an 'end' terminal 619.

The 'update system virtual time' procedure 617 updates the system's virtual time as:

System.VT=+=max(-MaxChange,
min(MaxChange, MeanAVT-System.VT));

Thus, System. VT (SVT) converges towards the mean actual virtual time for each ready element; and System. VT never changes faster than MaxChange. The 'update system virtual time' process 610 converges towards the mean AVT of the ready elements. The System. VT value represents mean of the virtual time of the ready elements. Once this reference is determined, the scheduler can determine the AVT for a blocked element when it is made ready, as will be subsequently described with respect to FIG. 7 and FIG. 8B. In addition, by not changing the System. VT value by more than the inflated resource cost of the just active element, the scheduler can forgive virtual time debts by the taxable amount, or tax elements that have a saving. In addition:

max(-MaxChange, min(MaxChange, MeanAVT-System.VT));

represents an adjustment value that is used to adjust the system reference-use (the system virtual time). The adjustment value can be used to adjust the AVT of the blocked elements so that the AVT of the blocked elements substantially tracks or converges to the SVT.

For a data switch, the system reference-use is similarly determined. For example, after each packet is transferred from the queue to the output port(s), the measure-of-use is determined from the packet size and the queue's weight (for example, the packet size divided by queue weight) and this is defined to be the resource cost. The system also determines the MeanAVT for each non-empty queue. Using these definitions, the system reference-use is determined as was previously described.

Figure 7:
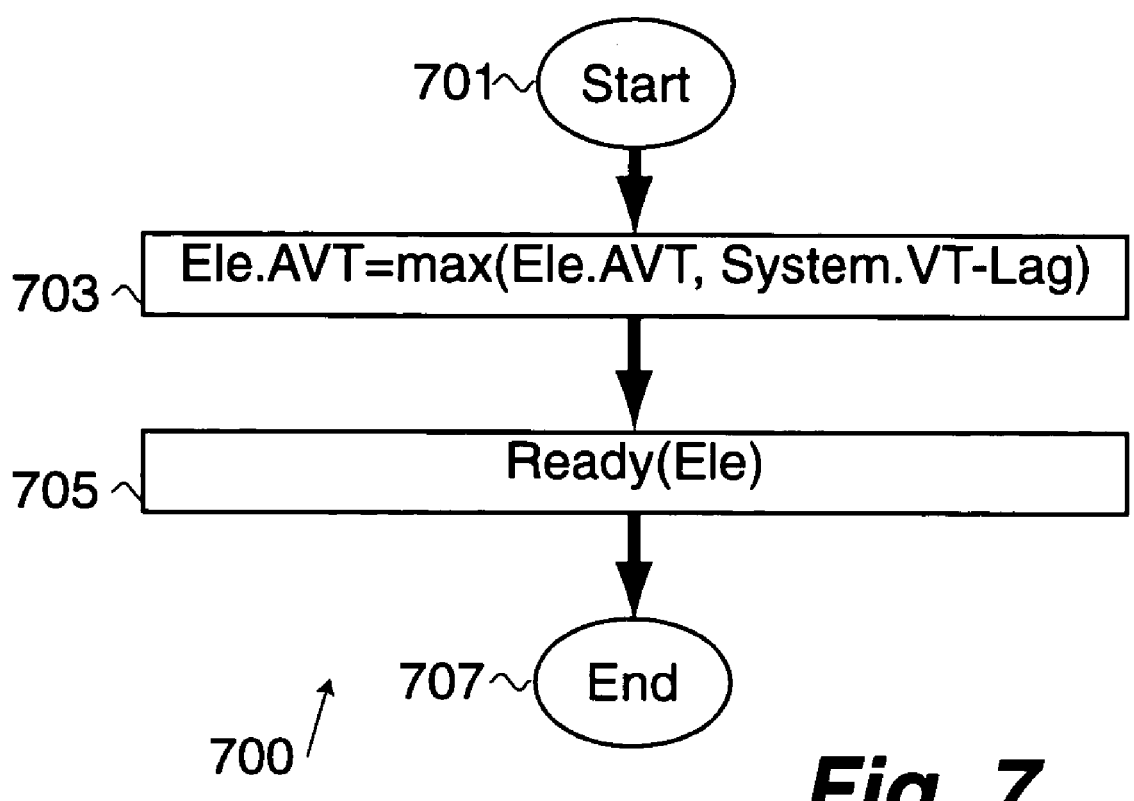
FIG. 7 illustrates a process to update the virtual time of a previously inactive element in accordance with a preferred embodiment.

FIG. 7 illustrates an 'update virtual time for unblocked element' process, indicated by general reference character 700, that can be invoked when the condition blocking the execution of the thread is satisfied (for example, occurrence of a timer completion, a device interrupt, or some other exception or condition). The process 700 initiates at a 'start' terminal 701 and continues to a 'set element's virtual time' procedure 703 that updates the AVT for the element according to:

Ele.AVT=max(Ele.AVT, System.VT-Lag)

where Lag is a constant such as the CPU cost of for executing a typical element for a quantum.

Once the element's AVT is updated, the element is made ready so that it can compete for the resource by a 'ready' procedure 705. The process 700 completes through an 'end' terminal 707.

The purpose of the process 700 is to compensate for elements that have been blocked for significant amounts of time. Because the blocked elements are not executing, their AVT is not increased (in some embodiments) during the time blocked. Thus, the blocked element's AVT remains low as compared to the elements that are consuming resource. Without this adjustment, the newly unblocked element would dominate the other elements for some period of time.

The Lag value is used so that elements that are briefly suspended are not penalized in that they are more likely to run than elements that have not been blocked (thus, a thread blocked by a page fault is more likely to run).

FIG. 8A illustrates a record virtual time process, indicated by general reference character 800, that records information about the element's scheduling state at the time the element blocked. The record virtual time process 800 initiates at a 'start' terminal 801 when the element becomes blocked. The record virtual time process 800 continues to a 'save sleep real time' procedure 803 that stores the real time that the element blocked. A 'save sleep system virtual time' procedure 805 saves the system virtual time. Both of these values are associated with the element. Thus, each blocked element is associated with its own respective values. The record virtual time process 800 completes through an 'end' terminal 807.

Thus, when the element becomes blocked, the system captures information that can be used to reevaluate the element's AVT when the element subsequently becomes ready.

Figure 8B:
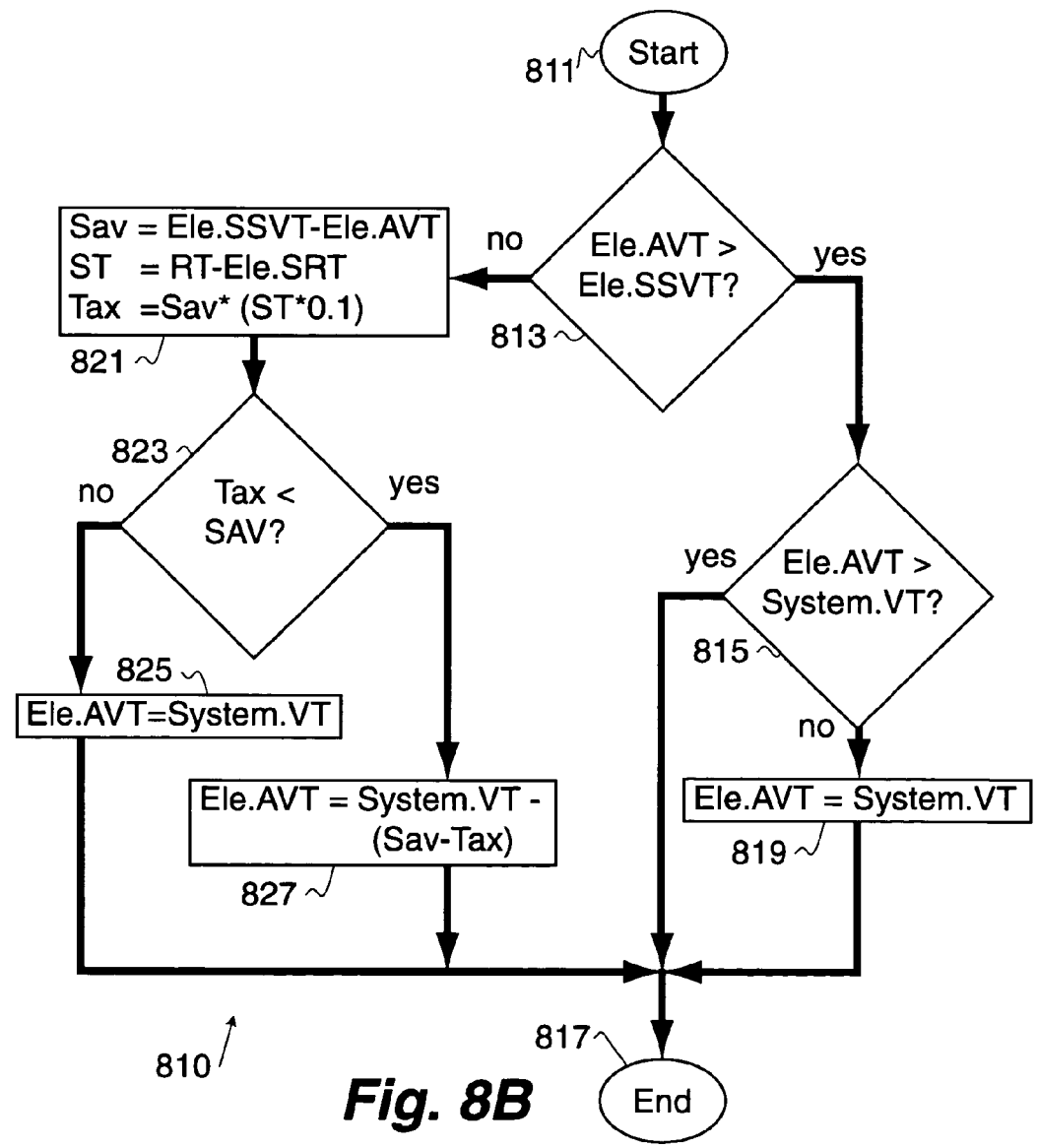
FIG. 8B illustrates a ready inactive element in accordance with a preferred embodiment.

FIG. 8B illustrates a ready blocked element process, indicated by general reference character 810, that can be used when an element, that has information stored by the record virtual time process 800 of FIG. 8A, becomes ready. The ready blocked element process 810 initiates at a 'start' terminal 811 and advances to a 'was element in debt' decision procedure 813. The 'was element in debt' decision procedure 813 determines whether the element was in debt at the time the element blocked (that is, at the time the element blocked, whether it had received more than its fair share of the resource—possibly by borrowing). If so, the ready blocked element process 810 continues to an 'is element in debt' decision procedure 815 that determines whether the element is currently in debt (whether AVT is greater than the current SVT). If so, the ready blocked element process 810 does not adjust the element's AVT and the ready blocked element process 810 completes through an 'end' terminal 817.

However, if the 'is element in debt' decision procedure 815 determines that the element is no longer in debt (that is, the SVT has passed the element's AVT), then a 'reset debt' procedure 819 sets the element's AVT to the SVT (thus, the element continues to consume resource in rough parity with the other ready elements so as to maintain fairness when the element becomes ready). Then, the ready blocked element process 810 completes through the 'end' terminal 817.

Looking again at the 'was element in debt' decision procedure 813, if the element was not in debt when it became blocked (that is, that the element had not received its fair share of the resource at the time it blocked), the ready blocked element process 810 continues to a 'determine intermediate values' procedure 821. The 'determine intermediate values' procedure 821 evaluates:

sav=Ele.SSVT-Ele.AVT;
st=RT-Ele.SRT;
tax=sav*(st*taxrate);

where sav stores the amount of virtual time used by the element less the element's fair share at the time the element blocked—the savings; st stores the amount of time the element was blocked—the sleep time; taxrate stores the rate that the debt is forgiven or the savings taxed; and tax stores the amount of time that will be removed from the savings.

An 'element retain some savings' decision procedure 823 determines whether the element is to retain some of its savings when it becomes ready. If not, a 'forfeit savings' procedure 825 sets the element's AVT to the SVT (thus, the element continues to consume resource in rough parity with the other ready elements so as to maintain fairness when the element becomes ready. Then, the ready blocked element process 810 completes through the 'end' terminal 817.

However, if the 'element retain some savings' decision procedure 823 determines that the element is to retains some of its savings, the ready blocked element process 810 continues to a 'retain some savings' procedure 827 that sets the element's AVT to the current SVT less the taxed savings. Then, the ready blocked element process 810 completes through the 'end' terminal 817.

Thus, when the element becomes unblocked, its AVT is adjusted so that the unblocked element fairly competes with other ready elements and possibly reinstating some savings or debt.

Yet another preferred embodiment adjusts each blocked element's AVT dependent on the changes to the SVT. Thus, when the SVT is modified (for example, by the 'update system virtual time' process 610 of FIG. 6B) the AVT of each blocked element is similarly modified so that the blocked elements continue to substantially track the changes in the SVT.

Figure 9:
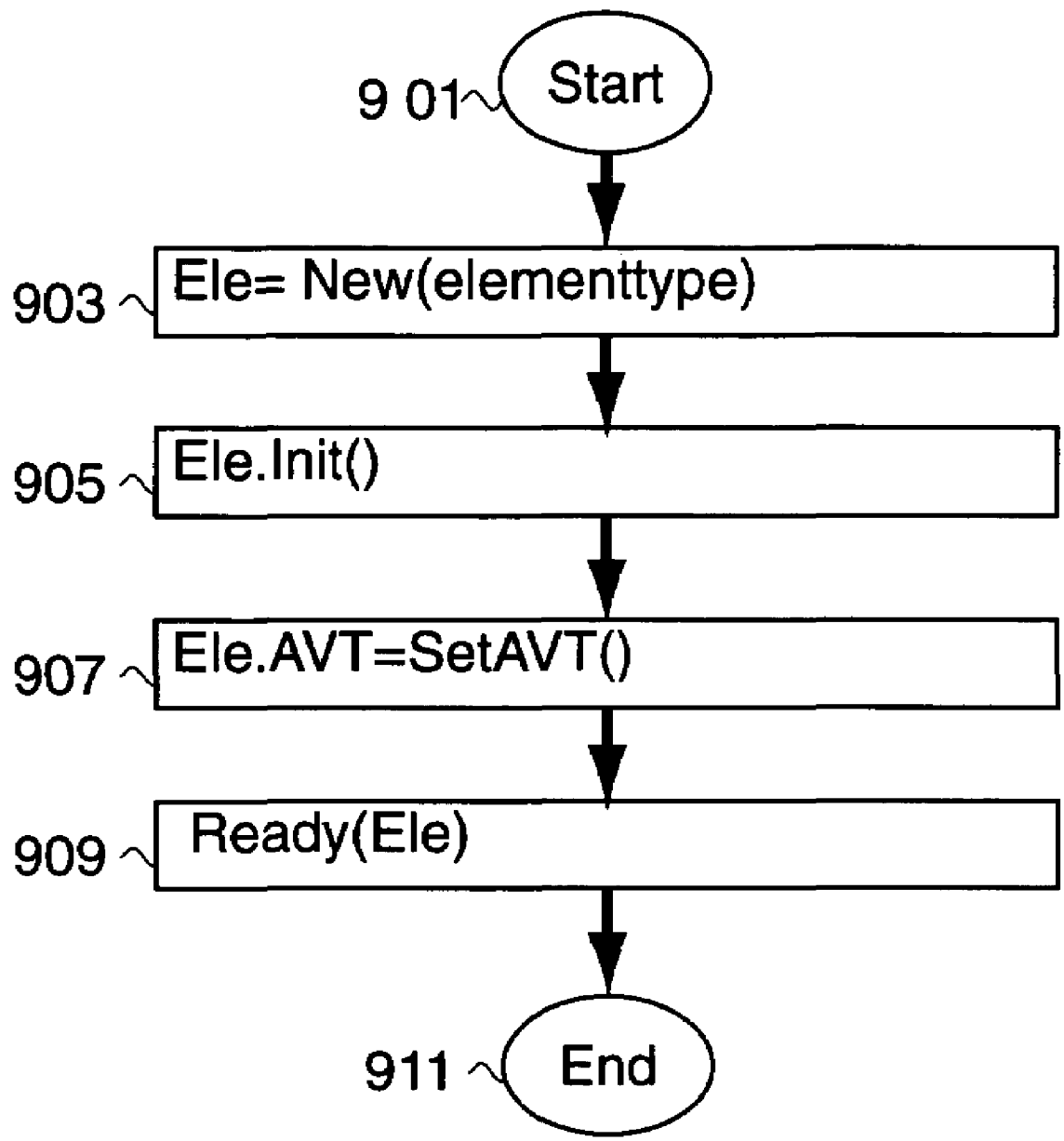
FIG. 9 illustrates a process to create a new element in accordance with a preferred embodiment.

FIG. 9 illustrates a 'create new element' process, indicated by general reference character 900, that is used in a computer that has the capability of creating new threads or in a data switch that has dynamically created queues. The following description is directed toward a computer system where the new element is a new thread. Similar operations can be performed by the data switch. In a computer system, the new element (the child element) is generated by an existing element (the parent element).

The 'create new element' process 900 initiates at a 'start' terminal 901 and continues to an 'allocate element storage' procedure 903 that allocates storage for the new element. Once storage is allocated for the new element, an 'initialize element' procedure 905 initializes the new element. Next, a 'set virtual time' procedure 907 sets the initial AVT for the child element so that the child element will fairly share the resource with respect to its weight. Next, the 'create new element' process 900 continues to a 'ready element' procedure 909 that conditions the element to compete for the resource and makes the element such that it can be selected by the 'select element' process 500 of FIG. 5. Finally, the 'create new element' process 900 completes through an 'end' terminal 911.

In one preferred embodiment, the 'set virtual time' procedure 907 copies the AVT from the parent element to the child element. This approach causes the child element to have the same advantage or penalty with respect to the other elements as does the parent element. In another preferred embodiment, the 'set virtual time' procedure 907 copies the SVT to the child element's AVT. This embodiment starts the child element without an advantage or penalty with respect to mean of the other ready elements.

Figure 10:
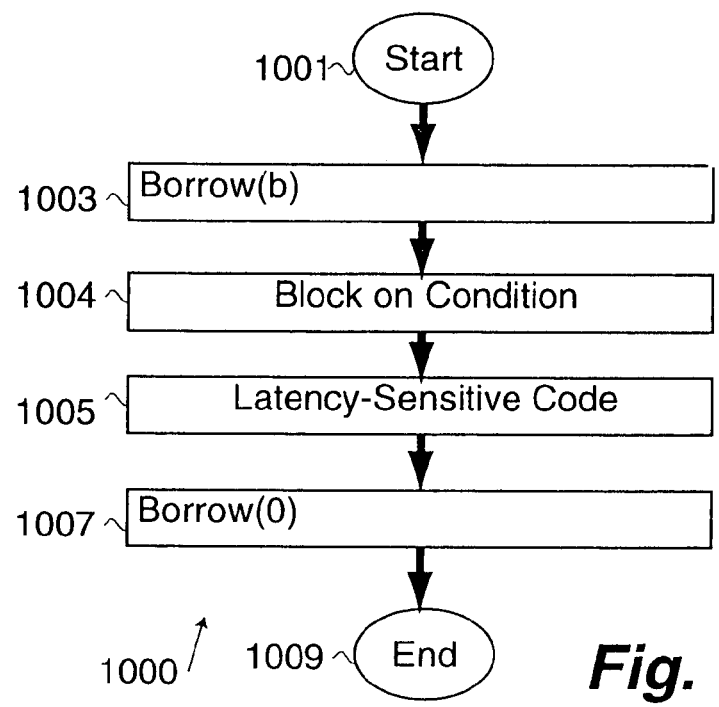
FIG. 10 illustrates how a process can borrow and repay virtual time to handle latency-sensitive conditions in accordance with a preferred embodiment.

FIG. 10 illustrates a virtual time borrowing process, indicated by general reference character 1000, used by a thread. The virtual time borrowing process 1000 initiates at a 'start' terminal 1001 prefatory to executing latency-sensitive code. The virtual time borrowing process 1000 then continues to a 'borrow virtual time' procedure 1003 that specifies the amount of virtual time to borrow to the value of b. Next, the virtual time borrowing process 1000 continues to a 'block on condition' procedure 1004 that stops execution of the thread that borrowed the time. Thus, when the thread becomes ready, the 'select element' process 500 will be more likely to select the thread as compared to other threads that have not borrowed virtual time because the EVT for an element is the element's AVT minus b (recall that the EVT is used schedule a thread). After borrowing the virtual time, a 'latency-sensitive' procedure 1005 will more likely be scheduled. After the 'latency-sensitive' procedure 1005 completes, the virtual time borrowing process 1000 can optionally return the borrowed virtual time at a 'return borrowed virtual time' procedure 1007 (which specifies the amount of virtual time to borrow to the value of zero) and compete through an 'end' terminal 1009. This particular embodiment is useful when the thread includes both latency-sensitive code and latency-insensitive code. In particular, the virtual time borrowing process 1000 would be invoked just before blocking for a condition that, when complete, requires a rapid response. The value of b can also be specified external to the element. For example, b can be a task parameter that can be adjusted by a user or system administrator using appropriate configuration programs, techniques or methods.

Figure 11:
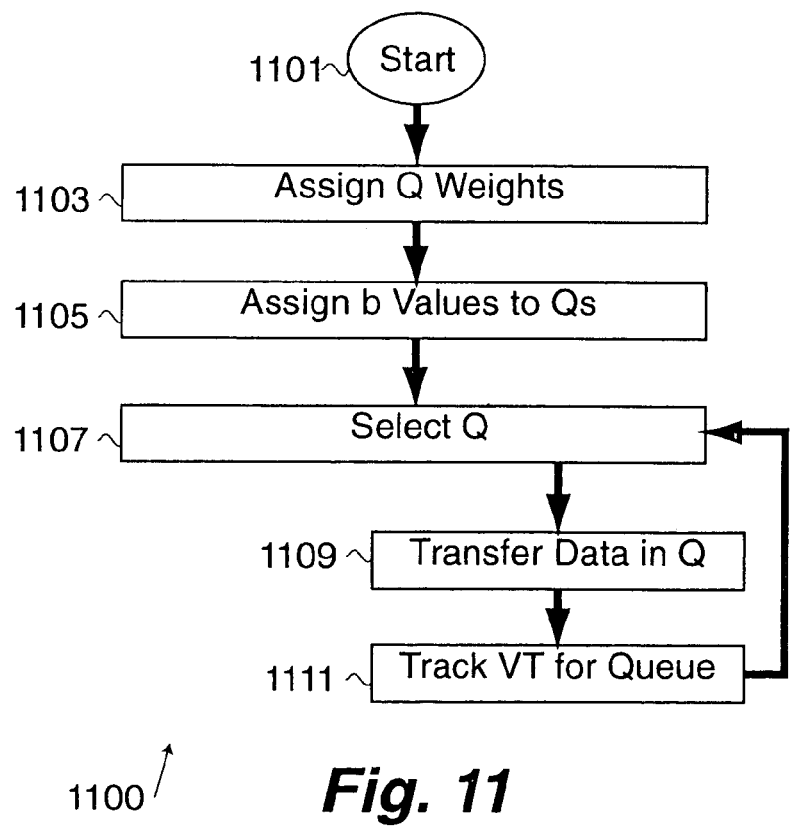
FIG. 11 illustrates a BVT scheduling process within a data switch in accordance with a preferred embodiment.

FIG. 11 illustrates a BVT process, indicated by general reference character 1100, for selecting a queue to feed an output port of a data switch. The BVT process 1100 initiates at a 'start' terminal 1101 and continues to an 'assign Q weights' process 1103. The 'assign Q weights' process 1103 locates each queue and specifies a weight for each queue. The weight again specifies the element's long-term share of the resource with respect to the other elements competing for the resource. Next, an 'assign b values to Qs' process 1105 assigns to each queue the borrowed virtual time parameter based on the latency-sensitivity of the data traffic assigned to the queue. The 'assign Q weights' process 1103 and the 'assign b values to Qs' process 1105 can be performed during the initialization phase of the data switch. In alternative embodiments, these processes can be configured manually or automatically while the data switch operates.

Next, a 'select Q' process 1107 determines which queue serving the output port has the smallest EVT. A data packet (pointed to by the first item in the selected queue) is then transferred from the memory to the output port by a 'transfer data in Q' process 1109. Next, a 'track virtual time' process 1111 updates the AVT for the queue. The BVT process 1100 continues to the 'select Q' process 1107.

One skilled in the art will understand that the invention provides fair scheduling while still allowing latency-sensitive elements (such as latency-sensitive threads and queues) to receive responsive scheduling.

From the foregoing, it will be appreciated that the invention has (without limitation) the following advantages:
1) the invention maintains long-term fairness for scheduled elements that use a resource while accommodating short-term latency-sensitive needs of the scheduled elements;
2) the invention provides better response times for latency sensitive elements;
3) the invention is less complex to implement than deadline scheduling approaches and provides a more fair allocation of the resource to multiple competing elements; and
4) the elements need not perform complex determinations as to how much resource that they need to preallocate.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A computer implemented method for scheduling comprising the steps of:
    scheduling a resource among a plurality of elements by:
    detecting expiration of a period-of-use of said resource, said resource allocated to an active one of said plurality of elements for said period-of-use;
    updating a measure-of-use of said resource for said resource for said active one of said plurality of elements responsive to said period-of-use and a measure-of-use adjustment, wherein said updating said measure-of-use comprises updating a virtual time for said active one of said plurality of elements; and
    assigning one of said plurality of elements to use said resource for a second period-of-use responsive to said measure-of-use and an element-specific selection adjustment for each element in said plurality of elements, wherein said element-specific selection adjustment for said each element in said plurality of elements is borrowed virtual time.

2. The method of claim 1 wherein said period-of-use is a scheduled period-of-use.

3. The method of claims 1 wherein said plurality of elements is a plurality of threads-of-execution and said resource is time available to a central processor unit (CPU) to execute said plurality of threads-of-execution.

4. The method of claim 3 wherein said virtual time for said active one of said plurality of elements is a virtual time for said active one of said plurality of threads-of-execution; wherein said updating said measure-of-use further comprises updating said virtual time for said active one of said plurality of threads-of-execution responsive to said period-of-use; and wherein said assigning said one of said plurality of elements further comprises determining an effective virtual time responsive to said virtual time and said element-specific selection adjustments.

5. The method of claim 4 further including specifying said borrowed virtual time by one of said plurality of threads-of-execution.

6. The method of claim 3 further including steps of:
    adding a new thread to said plurality of threads-of-execution by a parent thread; and
    initializing said virtual time for said new thread using said virtual time of said parent thread.

7. The method of claim 3 wherein said plurality of threads-of-execution includes a set of ready threads and a set of blocked threads.

8. The method of claim 7 wherein said method further includes adjusting each of said set of blocked threads by an adjustment value.

9. The method of claim 7 wherein said method further includes updating a system reference-use of said resource.

10. The method of claim 9 wherein said method further includes steps of:
    determining that one of said set of blocked threads has become ready; and
    updating, responsive to the step of determining, a virtual time for said one of said set of blocked threads or to said system reference-use as adjusted by a lag limit.

11. The method of claim 9 wherein said method further includes steps of:
    (a) determining that one of said set of blocked threads had become blocked;
    (b) saving said system reference-use and a current real-time value associated with said one of said set of blocked threads;
    (c) determining that said one of said set of blocked threads has become ready; and
    (d) updating a virtual time for said one of said set of blocked threads responsive to step (c) and further responsive to said saved system reference-use, said saved current real-time, and said system reference-use.

12. The method of claim 9 whereby said system reference-use is updated to converge towards a virtual time average over said set of ready threads.

13. The method of claim 12 wherein the step of updating said system reference-use is accomplished substantially in accordance with:
    reference_use=max(reference_use, min(reference_use+R+RCost, EVT));
    where reference_use is said system reference-use, R is a convergence rate, RCost is a resource usage, and EVT is an effective virtual time, and said resource usage is a function of said period-of-use and said measure-of-use adjustment assigned to said active one of said plurality of threads-of-execution.

14. The method of claim 12 wherein the step of updating said system reference-use is accomplished substantially in accordance with:
    reference_use+=max(-MaxChange, min(MaxChange, MeanAVT-reference-use));
    where reference_use is said system reference-use, MaxChange is responsive to a resource usage, and MeanAVT is an average AVT over a set of said plurality of elements, and said resource usage is a function of said period-of-use and said measure-of-use adjustment assigned to said active one of said plurality of threads-of-execution.

15. The method of claim 9 further including steps of:
adding a new thread to said plurality of threads-of-execution; and
initializing said virtual time for said new thread using said system reference-use.

16. The method of claim 1 wherein the said plurality of elements is a plurality of queues and said resource is a bandwidth of an output port of a data switch.

17. The method of claim 16 wherein the step of updating said measure-of-use further includes updating a virtual time for said active one of said plurality of queues responsive to said period-of-use; and wherein the step of assigning one of said plurality of elements further includes determining an effective virtual time responsive to said virtual time and said element-specific selection adjustment.

18. The method of claim 16 wherein said period-of-use is a transmission time period required to transfer one or more data packets from one of said plurality of queues to said output port.

19. The method of claim 16 wherein said plurality of queues includes a set of non-empty queues and a set of empty queues.

20. The method of claim 19 wherein said method further includes updating a system reference-use of said resource.

21. The method of claim 20 wherein said method further includes steps of:
(a) determining that one of said set of non-empty queues has become empty;
(b) saving said system reference-use and a current real-time value associated with said now-empty queue;
(c) determining that said now-empty queue has become non-empty; and
(d) updating a virtual time for said now-non-empty queue responsive to step (c) and further responsive to said saved system reference-use, said saved current real-time, and said system reference-use.

22. The method of claim 20 whereby said system reference-use is updated to converge towards a virtual time average over said set of non-empty queues.

23. The method of claim 22 wherein the step of updating said system reference-use is accomplished substantially in accordance with:
reference_use=max(reference_use, min(reference_use+R+RCost, EVT));
where reference_use is said system reference-use, R is a convergence rate, RCost is a resource usage, and EVT is said effective virtual time, and said resource usage is a function of said period-of-use and a weight assigned to said active one of said plurality of queues.

24. The method of claim 22 wherein the step of updating said system reference-use is accomplished substantially in accordance with:
reference_use+=max(-MaxChange, min(MaxChange, MeanAVT-reference-use));
where reference_use is said system reference-use, MaxChange is responsive to a resource usage, and MeanAVT is an average AVT over at set of said plurality of elements, and said resource usage is a function of said period-of-use and a weight assigned to said active one of said plurality of queues.

25. The method of claim 20 further including steps of:
adding a new queue to said plurality of queues; and
initializing said virtual time for said new queue using said system reference-use.

26. The method of claim 20 wherein the step of updating alters said system reference-use using an adjustment value and said method further includes adjusting each of said set of empty queues by said adjustment value when said system reference-use is updated.

27. The method of claim 26 whereby said system reference-use is updated to converge towards a virtual time average over said set of non-empty queues.

28. The method of claim 27 wherein the step of updating said system reference-use is accomplished substantially in accordance with:
reference_use=max(reference_use, min(reference_use+R+RCost, EVT));
where reference_use is said system reference-use, R is a convergence rate, RCost is a resource usage, and EVT is said effective virtual time, and said resource usage is a function of said period-of-use and a weight assigned to said active one of said plurality of queues.

29. The method of claim 27 wherein the step of updating said system reference-use is accomplished substantially in accordance with:
reference_use+=max(-MaxChange, min(MaxChange, MeanAVT-reference-use));
where reference_use is said system reference-use, MaxChange is responsive to a resource usage, and MeanAVT is an average AVT over at set of said plurality of elements, and said resource usage is a function of said period-of-use and a weight assigned to said active one of said plurality of queues.

30. A scheduling apparatus for scheduling a computer resource among a plurality of elements, comprising:
a detection mechanism configured to detect expiration of a period-of-use of said resource, said resource allocated to an active one of said plurality of elements for said period-of-use;
an update mechanism configured to update a measure-of-use of said resource for said active one of said plurality of elements responsive to said period-of-use and a measure-of-use adjustment, wherein said update mechanism comprises an update virtual time mechanism configured to update a virtual time for said active one of said plurality of elements; and
an assignment mechanism configured to assign one of said plurality of elements to use said resource for a second period-of-use responsive to said measure-of-use and an element-specific selection adjustment for each element in said plurality of elements, wherein said element-specific selection adjustment for said each element in said plurality of elements is borrowed virtual time.

31. The apparatus of claim 30 wherein said period-of-use is a scheduled period-of-use.

32. The apparatus of claim 30 further including a central processing unit (CPU) and a memory coupled to said CPU, wherein said plurality of elements is a plurality of threads-of-execution and said resource is time available to said CPU to execute said plurality of threads-of-execution.

33. The apparatus of claim 32 wherein said update virtual time mechanism is an update thread virtual time mechanism; wherein said virtual time for said active one of said plurality of elements is a virtual time for said active one of said plurality of threads-of-execution; wherein the update mechanism further comprises said update thread virtual time mechanism; and wherein said update thread virtual time mechanism is configured to update said virtual time for said active one of said plurality of threads-of-execution responsive to said period-of-use; and wherein said assignment mechanism further comprises an effective virtual time determination mechanism configured to determine an effective virtual time responsive to said virtual time and said borrowed virtual time.

34. The apparatus of claim 33 further including a borrowed time specification mechanism configured to specify said borrowed virtual time by one of said plurality of threads-of-execution.

35. The apparatus of claim 32 further including:
a thread creation mechanism configured to add a new thread to said plurality of threads-of-execution by a parent thread; and
a virtual time initialization mechanism configured to initialize said virtual time for said new thread using said virtual time of said parent thread.

36. The apparatus of claim 32 wherein said plurality of threads-of-execution includes a set of ready threads and a set of blocked threads.

37. The apparatus of claim 36 further including a blocked thread update mechanism configured to adjust each of said set of blocked threads by an adjustment value.

38. The apparatus of claim 36 further including a reference-use update mechanism configured to update a system reference-use of said resource.

39. The apparatus of claim 38 further including:
a blocked determination mechanism configured to determine that one of said set of blocked threads had become blocked;
a capture mechanism, responsive to the blocked determination mechanism, configured to save said system reference-us and a current real-time value associated with said one of said set of blocked threads.

40. The apparatus of claim 38 wherein the reference-use update mechanism alters said system reference-use using an adjustment value and said apparatus further includes a virtual time update mechanism configured to adjust each of said set of blocked threads by said adjustment value substantially when said system reference-use is updated.

41. The apparatus of claim 38 whereby the reference-use update mechanism updates said system reference-use so that said system reference-use converges to virtual time average over said set of ready threads.

42. The apparatus of claim 41 wherein the reference-use update mechanism substantially implements:
reference_use=max(reference_use,
min(reference_use+R+RCost, EVT));
where reference_use is said system reference-use, R is a convergence rate, RCost is a resource usage, and EVT is said effective virtual time, and said resource usage is a function of said period-of-use and a weight assigned to said active one of said plurality of threads-of-execution.

43. The apparatus of claim 41 wherein the reference-use update mechanism substantially implements:
reference-use+=max(-MaxChange,
min(MaxChange, MeanAVT-reference-use));
where reference_use is said system reference-use, MaxChange is responsive to a resource usage, and MeanAVT is an average AVT over at set of said plurality of elements, and said resource usage is a function of said period-of-use and a weight assigned to said active one of said plurality of threads-of-execution.

44. The apparatus of claim 38 further including:
a thread creation mechanism configured to add a new thread to said plurality of threads-of-execution; and a virtual time initialization mechanism configured to initialize said new thread using said system reference-use.

45. The apparatus of claim 30 wherein said plurality of elements is a plurality of queues and said resource is a bandwidth of an output port of a data switch.

46. The apparatus of claim 45 wherein the update mechanism further includes an update queue virtual time mechanism configured to update a virtual time for said active one of said plurality of queues responsive to said period-of-use; and wherein the assignment mechanism further includes an effective virtual time determination mechanism configured to determine an effective virtual time responsive to said virtual time and said borrowed virtual time.

47. The apparatus of claim 45 wherein said period-of-use is a transmission time period required to transfer one or more data packets from one of said plurality of queues to said output port.

48. The apparatus of claim 45 wherein said plurality of queues includes a set of non-empty queues and a set of empty queues.

49. The apparatus of claim 48 wherein and said apparatus further includes a reference-use update mechanism configured to update a system reference-use of said resource.

50. The apparatus of claim 49 further including:
a blocked determination mechanism configured to determine that one of said set of non-empty queues has become empty;
a capture mechanism configured to save said system reference-use and a current real-time value associated with non-empty queue;
a ready determination mechanism configured to determine said now-empty queue has become non-empty; and
a virtual time update mechanism configured to update a virtual time for said now-non-empty queue responsive to the ready determination mechanism and further responsive to said saved system reference-use, said saved current real-time, and said system reference-use.

51. The apparatus of claim 49 wherein the reference-use update mechanism alters said system reference-use using an adjustment value and said apparatus further includes a virtual time update mechanism configured to adjust each of said set of empty queues by said adjustment value when said system reference-use is updated.

52. The apparatus of claim 49 wherein the reference-use update mechanism substantially implements:
reference_use=max(reference_use,
min(reference_use+R+RCost, EVT));
where reference_use is said system reference-use, R is a convergence rate, RCost is a resource usage, and EVT is said effective virtual time, and said resource usage is a function of said period-of-use and a weight assigned to said active one of said plurality of queues.

53. The apparatus of claim 49 wherein the reference-use update mechanism substantially implements:
reference_use +=max(-MaxChange,
min(MaxChange, MeanAVT-reference_use));
where reference_use is said system reference-use, MaxChange is responsive to a resource usage, and MeanAVT is an average AVT over at set of said plurality of elements, and said resource usage is a function of said period-of-use and a weight assigned to said active one of said plurality of queues.

54. The apparatus of claim 49 further including:
a thread creation mechanism configured to add a new queue to said plurality of queues; and a virtual time initialization mechanism configured to initialize said virtual time for said new queue using said system reference-use.

55. A computer program product including:

a computer usable storage medium having computer readable code embodied therein for scheduling a resource among a plurality of elements, said computer readable code including:

computer readable program code configured to cause said computer to effect a detection mechanism configured to detect expiration of a period-of-use of said resource, said resource allocated to an active one of said plurality of elements for said period-of-use;

computer readable program code configured to cause said computer to effect an update mechanism configured to update a measure-of-use of said resource for said active one of said plurality of elements responsive to said period-of-use and a measure-of-use adjustment, wherein said update mechanism comprises an update virtual time mechanism configured to update a virtual time for said active one of said plurality of elements; and computer readable program code configured to cause said computer to effect an assignment mechanism configured to assign one of said plurality of elements to use said resource for a second period-of-use responsive to said measure-of-use and an element-specific selection adjustment for each element in said plurality of elements, wherein said element-specific selection adjustment for said each element in said plurality of elements is borrowed virtual time.

56. The computer program product of claim 55 wherein said period-of-use is a scheduled period-of-use.

57. The computer program product of claim 55 wherein said plurality of elements is a plurality of threads-of-execution and said resource is time available to said CPU to execute said plurality of threads-of-execution.

* * * * *